(12) United States Patent
Fidalgo et al.

(10) Patent No.: US 11,456,491 B2
(45) Date of Patent: Sep. 27, 2022

(54) METHOD FOR MANUFACTURING ELECTRONIC OBJECT COMPRISING A BODY AND A POROUS-MEMBRANE-COMPRISING BATTERY

(71) Applicant: THALES DIS FRANCE SAS, Meudon (FR)

(72) Inventors: Jean-Christophe Fidalgo, Gemenos (FR); Béatrice Dubois, Gemenos (FR); Laurence Robles, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 664 days.

(21) Appl. No.: 16/469,916

(22) PCT Filed: Nov. 28, 2017

(86) PCT No.: PCT/EP2017/080718
§ 371 (c)(1),
(2) Date: Aug. 14, 2019

(87) PCT Pub. No.: WO2018/108521
PCT Pub. Date: Jun. 21, 2018

(65) Prior Publication Data
US 2019/0363404 A1 Nov. 28, 2019

(30) Foreign Application Priority Data

Dec. 16, 2016 (EP) ..................................... 16306715

(51) Int. Cl.
*H01M 10/00* (2006.01)
*H01M 10/42* (2006.01)
(Continued)

(52) U.S. Cl.
CPC ...... *H01M 10/425* (2013.01); *G06K 19/0702* (2013.01); *H01M 8/04089* (2013.01);
(Continued)

(58) Field of Classification Search
CPC ........... H01M 10/425; H01M 8/04089; H01M 8/1097; H01M 12/06; G06K 19/0702
See application file for complete search history.

(56) References Cited

U.S. PATENT DOCUMENTS 3,478,741 A 11/1969 Simor
3,585,239 A 6/1971 Stein et al.
(Continued)

FOREIGN PATENT DOCUMENTS

CA 2770449 A1 * 2/2011 .......... H01M 12/005
CN 1139363 A * 1/1997
(Continued)

OTHER PUBLICATIONS

International Search Report (PCT/ISA/210) dated Feb. 6, 2018, by the European Patent Office as the International Searching Authority for International Application No. PCT/EP2017/080718.
(Continued)

*Primary Examiner* — Naum Levin
(74) *Attorney, Agent, or Firm* — Marc Boillot; THALES DIS CPL USA, Inc

(57) ABSTRACT

The invention relates to a method for manufacturing a portable electronic-chip-comprising object including a body and a metal-air battery that is integrated into the body, the battery comprising an electrolyte layer and a protective air-porous membrane covering the electrolyte. The method includes a step of forming at least one air-supply duct extending from the protective membrane to an air source. An air-porous material is contained in the duct and completely blocks the duct at least in one place on its course. The
(Continued)

COUPE B-B invention also relates to the object corresponding to this method.

12 Claims, 3 Drawing Sheets

(51) Int. Cl.
*G06K 19/07* (2006.01)
*H01M 8/04089* (2016.01)
*H01M 12/06* (2006.01)
*H01M 8/1097* (2016.01)
*G06K 19/077* (2006.01)

(52) U.S. Cl.
CPC ......... *H01M 8/1097* (2013.01); *H01M 12/06* (2013.01); *G06K 19/07705* (2013.01); *G06K 19/07707* (2013.01); *G06K 19/07732* (2013.01)

(56) References Cited

U.S. PATENT DOCUMENTS

| | | | | |
|---|---|---|---|---|
| 4,118,544 A | * | 10/1978 | Przybyla | H01M 12/06 429/162 |
| 4,505,806 A | * | 3/1985 | Yamada | G01N 27/417 204/426 |
| 5,307,520 A | * | 4/1994 | Oyamada | G08B 5/228 455/343.1 |
| 7,232,623 B2 | * | 6/2007 | Yoshioka | H01M 8/0267 429/513 |
| 7,855,032 B2 | * | 12/2010 | Kamo | H01M 8/2455 429/479 |
| 8,551,672 B2 | * | 10/2013 | Wang Chen | H01M 8/028 429/510 |
| 10,664,020 B2 | * | 5/2020 | Yoshitani | G06F 3/0412 |
| 10,978,703 B2 | * | 4/2021 | Salehi-Khojin | H01M 4/88 |
| 2004/0197613 A1 | * | 10/2004 | Curlier | H01M 8/1025 429/506 |
| 2004/0247969 A1 | * | 12/2004 | Faris | H01M 12/06 429/432 |
| 2010/0255385 A1 | | 10/2010 | Wolf | |
| 2011/0033769 A1 | * | 2/2011 | Huang | H01M 12/08 429/488 |
| 2011/0070142 A1 | | 3/2011 | Lysenko et al. | |
| 2012/0129058 A1 | * | 5/2012 | Litzinger | H01M 12/08 429/403 |
| 2014/0106242 A1 | * | 4/2014 | Osborne | H01M 8/0206 429/407 |
| 2016/0313769 A1 | * | 10/2016 | Yoshitani | G06F 1/1694 |
| 2017/0039464 A1 | | 2/2017 | Depoutot et al. | |

FOREIGN PATENT DOCUMENTS

| | | | | |
|---|---|---|---|---|
| CN | 1256797 A | * | 6/2000 | ........... G04B 37/081 |
| CN | 1938891 A | * | 3/2007 | ........ H01M 8/04201 |
| CN | 205081193 U | * | 3/2016 | |
| CN | 107075161 A | * | 8/2017 | ............. B01D 71/48 |
| CN | 214088379 U | * | 8/2021 | |
| FR | 1558851 A | | 2/1969 | |
| FR | 1558852 A | | 2/1969 | |
| FR | 2858313 A1 | | 2/2005 | |
| JP | 2004362869 A | * | 12/2004 | |
| JP | 2007184254 A | * | 7/2007 | |
| JP | 4008963 B2 | * | 11/2007 | .......... B01J 19/0093 |
| JP | 4042101 B2 | * | 2/2008 | ........... G06F 1/1635 |
| WO | 0126175 A1 | | 4/2001 | |
| WO | 2004091026 A2 | | 10/2004 | |
| WO | WO-2004091026 A2 | * | 10/2004 | ............. H01M 8/02 |
| WO | 2011/002987 A1 | | 1/2011 | |
| WO | 2015158915 A1 | | 10/2015 | |

OTHER PUBLICATIONS

Written Opinion (PCT/ISA/237) dated Feb. 6, 2018, by the European Patent Office as the International Searching Authority for International Application No. PCT/EP2017/080718.

* cited by examiner

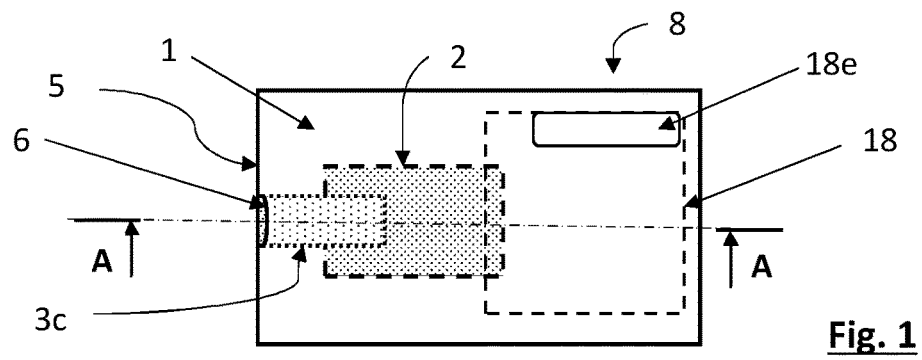
Fig. 1
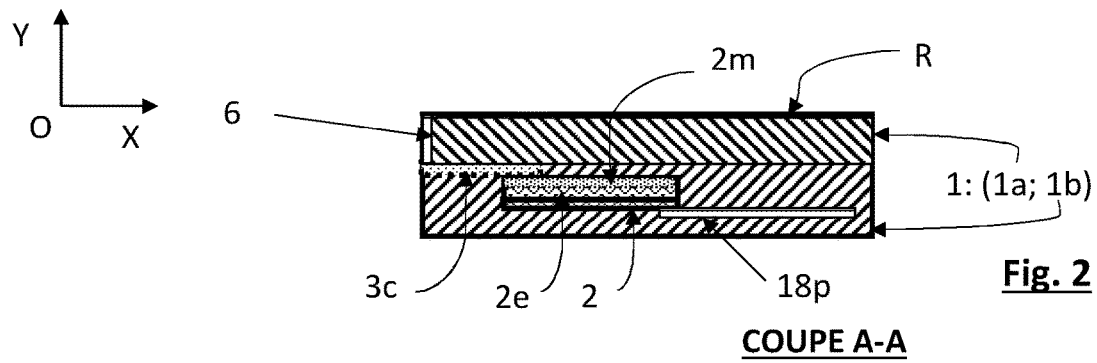
COUPE A-A   Fig. 2
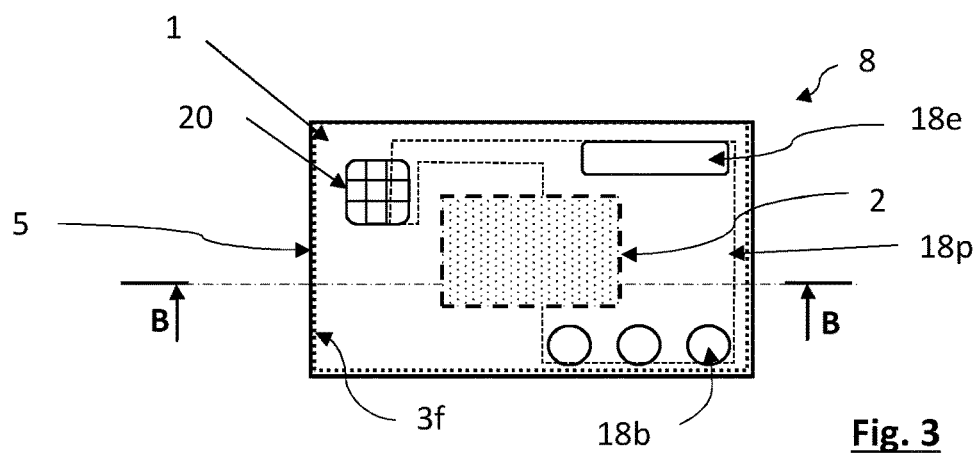
Fig. 3
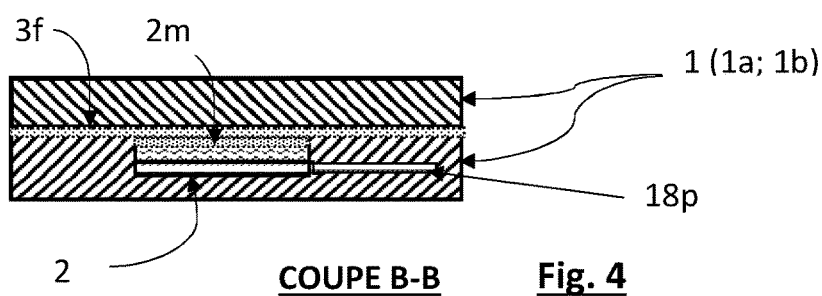
COUPE B-B   Fig. 4

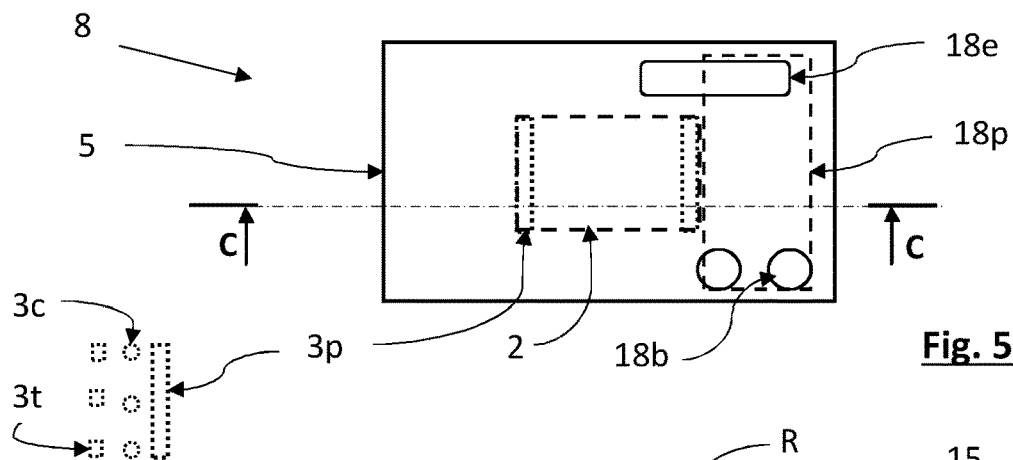
Fig. 5A
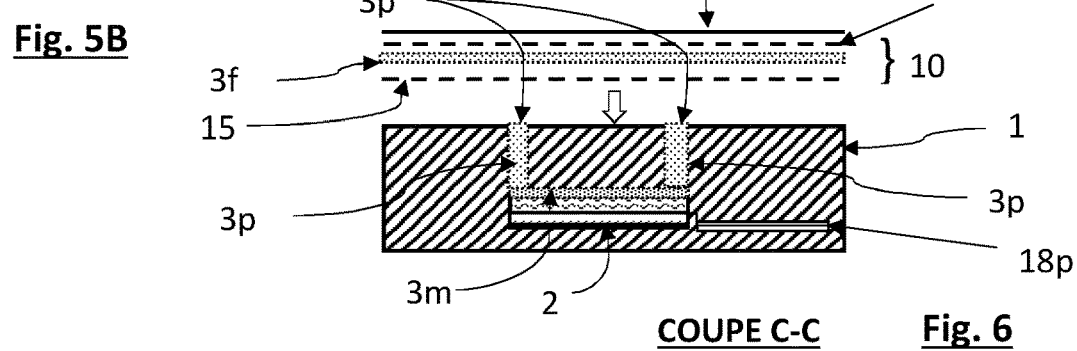
Fig. 5B
COUPE C-C Fig. 6
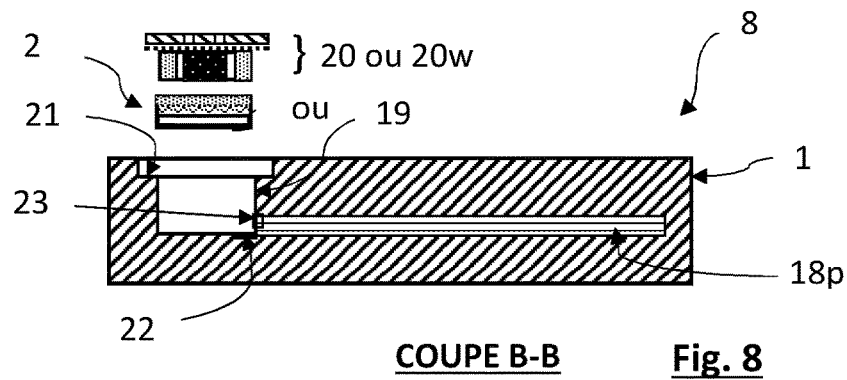
COUPE B-B Fig. 8
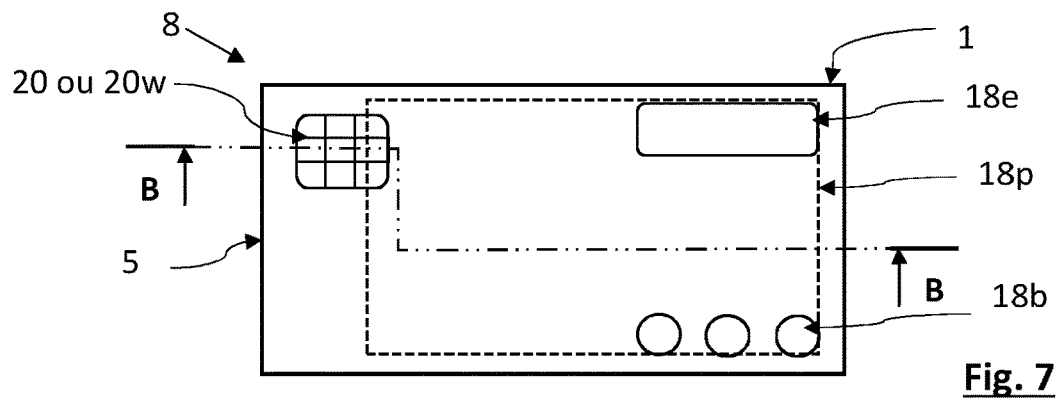
Fig. 7

METHOD FOR MANUFACTURING ELECTRONIC OBJECT COMPRISING A BODY AND A POROUS-MEMBRANE-COMPRISING BATTERY

TECHNICAL FIELD OF THE INVENTION

The invention concerns a process for manufacturing a portable electronic chip object comprising a body and a battery integrated into the body.

More specifically, the invention concerns the integration into a portable object of a battery comprising an electrolyte layer covered with an air-porous (or other gas) protective membrane. The battery is preferably of the metal-air type. It may also concern other batteries such as fuel batteries.

The portable objects concerned by the invention may include, in particular, smart cards, passports, mobile phones, RFID tags, communicating devices of the M2M type, objects to be worn such as watches, bracelets, belts, or any portable object having a different shape factor than the one above.

PRIOR ART

Battery-powered portable objects, especially active smart cards, require more and more energy to include new functions (or components) including a display, new sensors (fingerprint, contactless interfaces, amplifier, sensor, booster, cryptographic calculation generator, single-use number (OTP) generator).

There are Li-ion batteries available but their limited capacity has the disadvantage of shortening the life spas of the portable object and the applications built into it.

New metal-air batteries such as Li-air are known, whose potential capacity is very promising since it can reach about 10 times that of Li-Ion batteries, but the latter need to be supplied with oxygen. These batteries can use an electrolyte or a construction such as described in the unpublished French patent applications for a liquid hydrocarbon electrolyte (FR 1558851) and a metal/oxygen battery (FR 1558852) respectively, from the LITEN company.

The inventors have found that these cells are close to how fuel cells work and are considering their integration into portable objects.

Smart cards with a display including thin batteries necessarily placed inside the plastic layers forming the body of the smart card are known. For example, the batteries are completely embedded (or coated with resin or waterproof plastic layers), particularly for problems of reliability and visual quality of the card over its lifetime.

Document WO 01/26175 A1 describes a hearing aid device that includes a power source. The device comprises a metal-air battery having an anode and a cathode; a filling material disposed between the anode and the cathode that supports ion exchange; and a housing formed by at least a portion of the hearing aid device for retaining the filling material from the metal-air battery. The housing includes an opening to allow air passage to activate the metal-air battery.

Document WO 2015/158915 A1 describes a process for manufacturing a smart card with an integrated battery and a display in a cavity.

US document 2010/255385 A1 describes a mobile electronic device, including a power supply configured to generate energy using oxygen, an air inlet to supply air to said power supply, a sensor configured to detect at least one predetermined gas in the air and a mechanism to close the air inlet if said sensor detects said predetermined gas.

Objective/Technical Problem

This invention aims to solve the above-mentioned problems.

More specifically, this invention describes structural and/or manufacturing solutions for integrating such new batteries into portable objects on an industrial scale.

In particular, the inventors have noticed that the above batteries cannot be integrated into portable objects in the same way as today's thin smart card batteries. Inventors have noticed that these batteries they covet, for their portable host objects require a venting of the battery to allow oxygen to reach it.

SUMMARY OF THE INVENTION

The invention primarily concerns a process for manufacturing a portable electronic chip object comprising a body and a metal-air battery integrated into the body, said battery comprising a positive metal electrode, an electrolyte layer and one or more porous air-permeable protective membranes covering the electrolyte. The process comprises at least the formation of an air supply duct (or a supply) extending from the membrane to an air source; the process is characterized in that an air porous material is placed in said duct and completely closes said duct along its path, at least in places.

This ensures that the battery can be properly supplied with oxygen to enable it to operate.

Preferably, the porous or oxygen-permeable material is also waterproof.

In some cases, the duct is formed by a second porous air-permeable material distinct from a first porous membrane formed by one of the battery membranes. The second porous material can be of the same nature as the material of one of the battery membranes.

According to other characteristics:

The body comprises a cavity opening at the surface and a chip module is placed in the cavity, said battery being placed under the module, the conduit being arranged (or provided) in a space between a wall of the cavity and a peripheral surface of the module (in particular around the battery or chip with or without its coating resin, if the module has a chip);

The module includes a porous air-permeable support film and/or openwork metallizations;

The conduit can extend through the module, to the module or to the contact areas of the module;

The duct includes a layer of porous material extending parallel to one of the main surfaces of the body;

The duct includes a layer of porous material extending perpendicular to a major surface of the body;

The duct is in the form of a cylinder, ring, plate, capillaries;

The porous material includes as end or an area placed against the battery membrane;

The porous material is chosen from a waterproof and breathable fabric based on poly tetrafluoroethylene, glass fibre covered with poly tetrafluoroethylene, or polymer paper, or a PC, PVC, PET, Epoxy . . . sheet, micro-perforated locally or entirely.

The material can be hybrid; it can have a flexible part and a more rigid part made of (or comprising) ionic conductive or porous ceramic made of zirconia or porous silicon or an oxygen-permeable material such as a silicone or zeolite membrane.

The invention also concerns a portable object corresponding to the process.

According to other characteristics:

The porous material is hydrophobic or waterproof.

The porous material is in the form of a layer that extends substantially over the entire surface of the card inside or on the surface.

The material is permeable to gas (especially oxygen).

BRIEF DESCRIPTION OF THE FIGURES

FIG. 1 illustrates a view from above of an electronic object in the form of a smart card according to a first embodiment of the invention;

FIG. 2 is a cross-sectional view of the preceding Figure;

FIG. 3 illustrates a view from above of an electronic object in the form of a smart card according to a second embodiment of the invention;

FIG. 4 is a cross-sectional view of the preceding Figure;

FIG. 5A illustrates a top view of an electronic object in the form of a smart card according to a third embodiment of the invention;

FIG. 5B illustrates different configurations of the porous material;

FIG. 6 is a cross-sectional view of FIG. 5A;

FIG. 7 illustrates a top view of an electronic object in the form of a smart card (or other) according to a fourth preferred embodiment of the invention is which the battery is inserted into a cavity of the object;

FIG. 8 is a cross-sectional view of the preceding Figure;

DESCRIPTION

Figure 9:
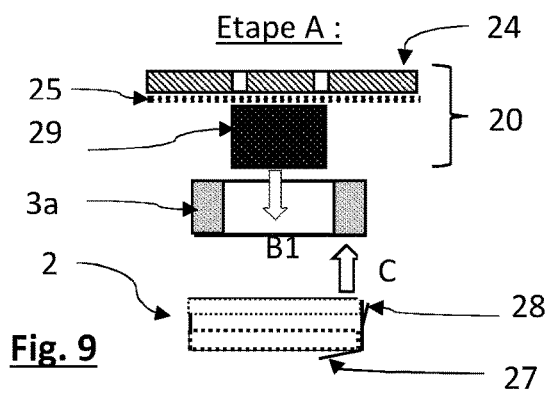
FIG. 9 shows a cross-section of a module assembly according to the previous embodiment.
Figure 10:
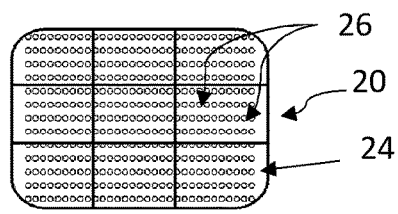
FIG. 10 is a top view of the module of the preceding Figure.

In the Figures, same references refer to identical or similar elements.

FIG. 1 shows an electronic object 8 (in the form of a smart card) obtained according to a first embodiment of the manufacturing process of the invention.

The portable object 8 with an electronic chip consists of a body 1 and a battery 2 of the metal-air type integrated in the body (the body can be made of PVC);

Battery 2 consists of an electrolyte layer inside with two electrodes and an porous air-permeable protective membrane covering the electrolyte and leading in this case to a main side of the surface. The battery can be obtained, for example, according to one of the above-mentioned patent applications (FR 1558851) and (FR 1558852).

The battery is a thin, flat, multi-layer structure with a substantially rectangular surface area that can be approximately one-quarter to one-eighth of the surface area of a standard ID1 smart card. It is preferably about 21 mm long and 20 mm wide and about 400 pm thick. It provides a voltage of 3V and an energy quantity of at least 30 mA/h to 200 mA/h depending on its dimensions.

In general, a metal-air battery combines a positive electrode made of a metallic material (Zn, Al, Li . . . ) and a negative air or oxygen electrode. One or more electrolytes allow metal ions to be dissolved and to be transported from the positive electrode to the negative electrode during discharge and back again if recharging is possible. The negative electrode is the place where $M-O_2/M_2-O_2/M_2-O_2/M_2-O$ compounds are reacted and formed . . . . Several types of electrolyte can be used (aqueous, aprotic, solid, polymer . . . ).

Depending on the electrolytes (e.g. aqueous), membranes protect the metal surface to exclude a violent reaction of the metal with oxygen or $H_2O$. The location of the negative electrode is a porous material with the largest possible specific surface area in order to allow both oxygen or air penetration and to be the physical support for the $M-O_2/M_2-O_2/M_2-O$ reaction products. The electrical voltages obtained in the case of a LiCq battery are in the order of 3V.

A Li-Air battery can also be found in portable object 8.

More specifically, a Li-Air battery is at the crossroads between a Lithium battery and a fuel cell.

In general, the core of a fuel cell consists of three elements, including two electrodes: an oxidizing positive electrode (anode) (electron emitter), a reducing negative electrode (cathode) (electron collector) and an electrolyte separating the electrodes. The fuel is supplied by continuous injection of fuel at the anode, usually hydrogen, and at the cathode, usually oxygen from the air or air itself. Continuous electrical energy is then available at the battery terminals. Hydrogen can be stored in a hydrogenated porous material such as porous silicon (W02004091026A2/FR2858313A1) or as proposed by the FEMTO-ST company.

Battery 2 is housed substantially in the heart of the smart card, particularly an the neutral fibre.

The card body 1 is obtained here by cold laminating by superimposing a base plastic sheet 1a with a peripheral edge or plastic frame inside which the battery is placed and, if necessary, a flexible electronic circuit to which the battery is connected.

The process can therefore include positioning in the plastic frame, the electrical/electronic circuit assembly formed by the battery and the electronic circuit (which may include any component generally used in the smart card industry).

The circuit may include a display screen 18e, a keyboard or buttons 18b, a flexible printed circuit board 18p); it may include a radio frequency antenna, a quartz, a clock, a microprocessor or microcontroller with electronic chip or other component, an OTP generator, a cryptographic generator, mass memory(s), a fingerprint sensor, a light-emitting diode . . . (not shown).

The battery can be connected in a conventional way to one of the above electronic/electrical components.

After positioning, a thermoplastic resin is poured onto the assembly and a cover sheet 1b is placed on top before undergoing hot or cold lamination (or pressing) of the structural assembly of the object thus formed (with the sheets) to have the desired thickness of 0.76 mm.

Alternatively (FIG. 6), body 1 can be obtained by injecting material around the above electrical/electronic assembly after it is placed in a mould or other shapes corresponding to the dimensions of the card body.

Card 8 can include a chip module 20 of the smart card type, with electrical contacts (or metallizations) 25 or contactless.

According to a characteristic of the first embodiment, the object includes a step of forming at least one (air or oxygen)

supply duct 3 extending from the membrane 3m to an air source. In this case, the air source is outside the body. It is made up of the surrounding atmospheric air.

A porous air-permeable material 3c being placed in said duct and completely closing said duct along its path at least in places so as to avoid water ingress.

In general, the duct can include a wall/tube whose wall has a certain thickness; it can include a porous material or simply no material inside. The conduit may not include a tube but simply consist of the porous material or the space occupying the volume of the tube.

Alternatively, the body may include a notch or well 6 in the form of a perforation, in particular cylindrical, leading to one of the surfaces of the body perpendicular to the main surface, or perpendicular to a surface of edge 5. This is done in order to place an airtight cap so as to seal the air supply and preserve the battery. This plug can be a repositionable or non-repositionable system, sticky and of the shape of the cavity, or flexible and covering the cavity. The well can be connected to the duct.

As an example, the battery is placed in the card body so that the porous membrane 3m covering (at least partly) the electrolyte facing the upper side of the card (or body) (visible in the foreground in FIG. 1) or, for FIG. 2, in the Y direction according to mark 0, X, Y.

For the implementation, the process may include a step of placing a layer 3f (or at least one strand 3c of porous air-permeable material against at least a portion of the outer surface of the porous membrane 2m covering battery 2.

The porous material can be placed before the body is formed, in particular before placing an adhesive resin on the electrical/electronic assembly and the cover sheet.

The porous material 3c, 3f is placed so as to extend to an external surface of the body located here on a lateral edge 5 of the body.

After lamination, structure 8 comprises or defines a duct 3 obtained by overmoulding the porous material with resin and/or the covering plastic sheet 1b of body 1. The porosity of the material is such that the resin does not penetrate into the porous material (or very little superficially) even under the effect of the laminating pressure.

The porous air-permeable material is thus placed in the said duct formed by overmoulding or machining and completely closes the duct along its entire path or in its great majority. Alternatively, the porous material can be placed at one end of the duct (e.g. at the mouth).

After lamination, the body can be cut to the final size of the card in order to have a sharp edge. The porous material that may protrude from the final periphery of the card can also be cut.

In FIG. 1, the body contains porous material 3c which leads to edge 5 of the card. Optionally, the process may include the formation of one or more wells extending from the porous material to an external surface of the card.

In the example, the process involves machining (drilling) a well (or notch) 6 at the lateral edge of the card body over half its thickness until it reaches the porous air-permeable material 3c. Thus, thanks to the notch 6, the porous material 3c opens both on the side of the upper main surface and on the edge 5 of the side edge of the card. The axis of the slot hole can be substantially centered on the peripheral boundary or edge of the card. The width of the notch can be e.g. 100 pm, 500 pm 1 mm, 2 or 3 mm. A series of holes smaller than 1 mm can also be drilled perpendicular to the surface of the board and create a passage of air to the porous material.

These holes may include a sealing element (plug) that is porous or permeable to air (or other gas). This air-permeable element may not be water-permeable.

To prevent or limit the reaction of the battery, these holes can be sealed with plugs or membranes (air (or gas)— impermeable complement closure element. Such as an adhesive polymer or rubber (or elastomer) membrane that can be removed and/or repositioned.

The body can be fitted with a decorative or finishing sheet R (shown only in FIG. 2) and covering the well (or notch) 6.

Alternatively, the process may include forming an air pocket above at least a portion of the battery cover membrane. For example, a plastic capsule or cap is placed on the membrane before dispensing adhesive resin on and around the capsule.

Then, after laminating the cover sheet 1b, the process can include arranging a duct by machining the body from the outer surface of the body until it reaches the air pocket.

The hole can be lateral, parallel to the plane of the card from edge 5 of the card or perpendicular to the main surface of the card body.

The duct thus formed can be at least partially filled with a porous air-permeable material. Preferably, only a portion close to the outer surface of the card is filled with porous material. This material thus forms a porous cover or wall, particularly a thin cylindrical one (e.g. 2-5 mm).

In FIGS. 5A, 5B and 6, according to a third embodiment variant, body 1 comprises two portions of porous material 3p distributed at two opposite lateral ends of the battery. The material extends over the entire width of the battery. In this case, the material has the shape of a plate or parallelepiped block. Alternatively, the material can have any shape, such as a cylindrical stick 3c, or a square section rod.

For implementing the process, it can use two rectangular air pockets or hollow capsules 3p placed on the surface of the porous membrane of the battery especially at two opposite lateral ends. The process operates substantially as before by resin covering and then with a cover sheet 1b before laminating and pressing. Alternatively, body 1 can be completely moulded. Elements (air-permeable in particular) 3c, 3t or 3p being positioned against the membrane like cores around which a moulding resin flows.

The process involves machining the capsules from the external surface of the card body. Then, as before, the process involves filling the cavities thus released with porous material of the dimensions corresponding to those of the cavities. The porous material can be glued to the vertical walls of the cavity.

Optionally, the process can include laminating a porous cover sheet 3f (identical or similar to that of FIG. 3) over the entire surface of the card. An adhesive 15 (preferably with openings facing the elements 3p, 3c, 3p) can be placed over the entire surface except for the air pockets (or rectangular areas 3p) filled with porous material. In the example, the adhesive is a hot melt grid, especially of polyurethane. Thus, the sections of porous material are not sealed by the adhesive sheet and allow an air supply via the sheet 3f.

The card may include a sheet or film for final decoration R or protection. It can include an open-ended or non-open-ended adhesive such as film 15 to attach the outer sheet to the porous layer 3f.

In this way, the structure allows an air supply through the thickness of the porous material sheet 3f leading to at least edges 5 of the card. This air collected on the edge can reach the two rectangular zones (or wells) 3p, 3c, 3t and feed the battery.

In general, for all embodiments, the process may provide for such a grid 15 (or equivalent such as striations, beads, adhesive, grid) above and/or below a layer 3f. The grid can be placed between the membrane 3m (or both surfaces of the battery) and a sheet (1a) placed above it in order to avoid delamination (due to lack of binding) if the membrane surface is too large.

Alternatively, the layer 3f can be perforated over its entire surface to allow adhesion, especially between the layers 1a and 1b.

FIGS. 3 and 4 illustrate an embodiment close to the first in which the cord 3c is replaced by a layer porous material 3f covering at least part but preferably the entire external surface of the membrane 2m of the battery 2. Sheet 3f preferably extends to one of the lateral edges of the card. In this case, the sheet extends to all the edges of the body. The process may include steps similar or identical to those described in relation to the first embodiment, unlike the shape factor of the cord 3c in relation to a layer 3f preferably covering the entire membrane.

FIGS. 7 and 8 illustrate a preferred method of carrying out the process, including a step of forming a cavity 19, 21 opening to the surface of an object body. This is a smart card body as in the previous examples. For example, the battery can open into the cavity or be placed in cavity 21, 22 by an inserting operation.

In this fourth embodiment, cavity 19, 21 receives an electronic module (electrical contact module with or without integrated circuit chip, contactless or hybrid, any display including watch or connected object, keyboard, sensor or other circuit 20w . . . ).

The periphery of this circuit module 20, 20w is significantly smaller than that of the periphery of cavity 19, 21, 31 so as to provide/arrange a peripheral air supply space extending from outside the card body (at the module level) to the battery membrane placed in or opening into the cavity.

Alternatively, the air supply can pass through the module or at least the contact areas or an open support film supporting the electrical contact areas or an antenna.

In this case, the body includes a printed circuit 18p with components (not shown). The circuit 18p includes interconnection tracks or areas 22 at the bottom of the cavity and a contact 23 on the wall (perpendicular to the bottom wall).

Figure 11:
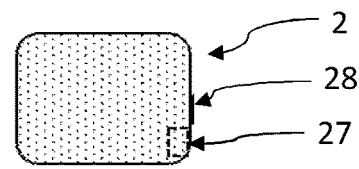
FIG. 11 shows the battery 2 of the previous figure configured for a cavity.
Figure 12:
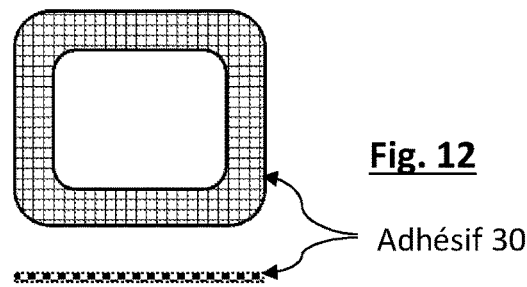
FIG. 12 shows an adhesive film to attach the module.
Figure 13:
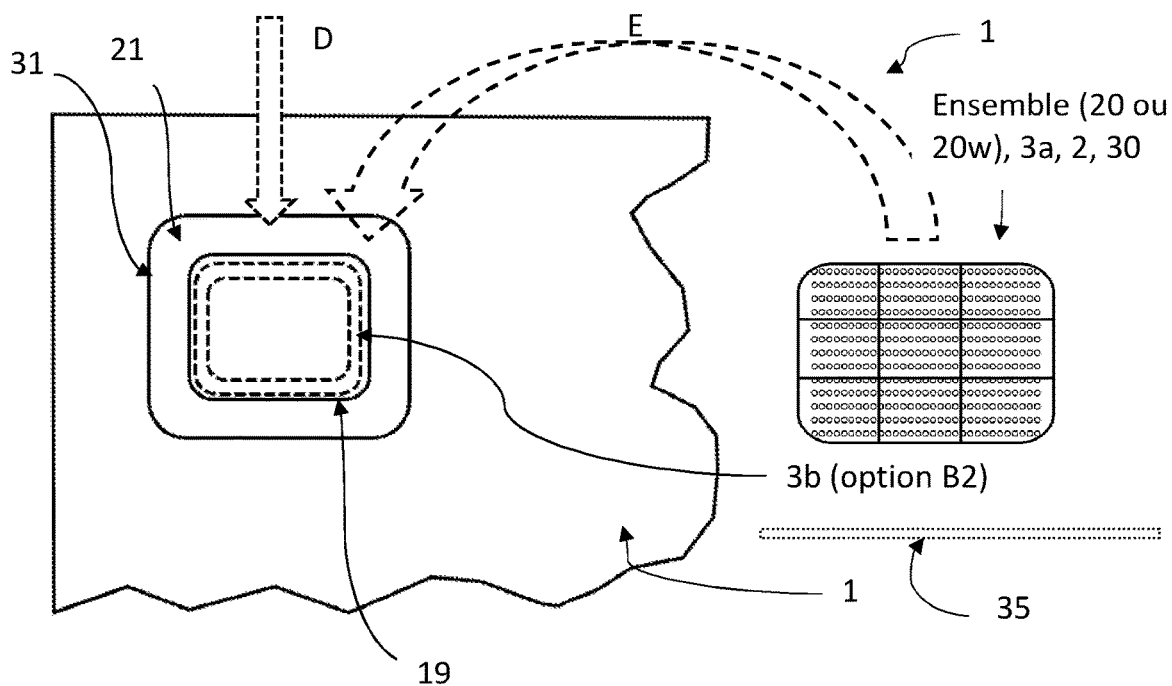
FIG. 13 illustrates the transfer of the module into the cavity.

The battery includes corresponding interconnection areas or tracks 27, 28 (respectively 27 under the battery and 28 on a lateral edge of the battery) (FIGS. 7 and 11)

Then, this space (between module and cavity wall) can be filled with porous material 3a preferably up to the surface of the card body or up to the module.

Alternatively, the porous material is in the form of a ring 3a and can be placed around the resin of the module or placed in the cavity as described below.

The process may involve depositing in the cavity, first the battery whose surface area is approximately of the same order of magnitude as that of the module (for example, 10×15 mm² or 8×20 mm² or 10×25 mm²). The process can then include placing the planned module 20 on the membrane. Air can be supplied to the periphery of module 20 through a peripheral space filled with porous air-permeable material 3c. The periphery may be partly formed by the periphery of the coating 29 of the integrated circuit chip inside the module.

If necessary, the electronic chip of the module can be flip-chip mounted to increase its thickness. The invention can provide a module thickness of 150 pm and a battery thickness of 400 pm. In this case, the ring 3a can be placed around the flip-chip mounted chip and with no or little coating material 29.

If necessary, the electronic chip of the module can be flip-chip mounted to increase its thickness.

If necessary, the electronic chip can be transferred to an circuit 18p placed in the body of the object to increase thickness.

The process can include connecting the electronic/electrical circuit 18p to the battery 2 by placing battery interconnection areas 27, 28 opposite those of the circuit 22, 23 when transferring into the cavity of one and/or the other. The connection can be made using electrical conductive adhesive material, in particular anisotropic (liquid or solid: ACF/ACP) or simply by electrical contact or electric solder paste.

The large capacity of the battery reduces its surface area or size to the point where it can be accommodated in the card body by an inserting operation such as a smart card module via the cavity of an electronic/electrical module.

Alternatively, module 20 can have interconnection areas extending from the chip to under the resin 26, particularly through the resin 26. Similarly, the battery may have interconnection areas extending in particular above the membrane 3m so as to be located opposite the interconnection areas of the module and allow a connection during the assembly.

Alternatively, contact areas 25 of the module can be replaced by a radiofrequency antenna to have contactless communication rather than by electrical contacts.

Alternatively, the perforated insulating film 25 can support below and/or above a radiofrequency antenna, in particular a spiral antenna for radiofrequency communication.

The process can include transferring the battery via a cavity opening on the surface of an object body so that it connects a printed circuit 18p previously inserted into the core of the card (or other circuit). The connection to an electronic printed circuit contained in the object can be made with adhesive conductive material or solder paste as above.

The interconnection areas may have been revealed by machining the cavity.

The process may involve filling the cavity with porous material to the surface of the object in such a way as to allow the battery to be supplied with air.

The process may involve covering object 8 with a porous sheet 3f or a sheet with porosities or micro-perforations located above the cavity containing the battery or opposite well(s) reaching the porous membrane of the battery.

The invention may provide for any porous material, air or oxygen-permeable, or ionic oxygen conductor or having oxygen permeability. Preferably, the material is not porous to water or moisture. It is waterproof. It can be in the form of felt, fibres, woven or non-woven fabric (or cloth), fibre layer. It may include, for example, fabric from the Gore-Tex™ brand. It can be based on polytetrafluoroethylene (Teflon), fabric that has undergone a waterproofing treatment but remains air-permeable, or a mixture of glass fibre and polytetrafluoroethylene, zeolite, a mixture of $TiO_2$ nanofibre, elements consisting of $Y_2O_3$ stabilized $ZrO_2$, porous silicon, dimethylsilicone or other silicone type layer.

Alternatively, if the battery operates with a gas (fuel) other than oxygen or air, the material may have a defined permeability to this gas.

Although described in relation to air or oxygen, the invention extends to other types of batteries operating with other gaseous fuels. In the description and claims, the terms "air" or "oxygen" may be substituted by another gaseous fuel (e.g. hydrogen) depending on the nature or type of battery concerned. This also applies to materials whose porosity or permeability is defined in relation to a gaseous fuel.

To prevent compression of the lamination, porous channels or capillaries can be placed perpendicular to the main surface of the object. The battery can lead directly to the external flat surface of the object. (As shown in FIG. 6)

FIGS. 9-13 illustrate a preferred embodiment of the manufacturing process of a smart card containing the air-metal battery 2.

In FIG. 9, the contact module is made with openwork contact areas 24 (or metallizations) with perforations or recesses 26 passing through the metallizations 24. These perforations can only be located in relation to the wells or areas of porous material 3a placed below. Thus, porous material 3a is annular and is placed in step B1 around the embedding resin 29 of the module chip and some of its electrical connections. The porous material has a shape corresponding to the shape of the cavity receiving it. In this case, it has a substantially rectangular cross-section.

The module may or may not have a dielectric carrier film 25. The contact areas may have been pre-cut rather than engraved on the carrier film 25.

Alternatively to the optional step B2, the ring is inserted into the cavity before the module is transferred, the battery having been placed first.

Then in step C, the battery fixed against the central part of the module on the resin, in particular with a glue point. The battery has approximately the same cross-section as the porous ring 3a.

Then, it should be reminded that the circuit 18p was able to open into the cavity by machining the cavity and clearing the interconnection areas (or terminals) 22, 23.

It is then possible to place conductive electrical material, in particular anisotropic (ACF, ACP) between the interconnection contacts 22, 23 and 27, 28.

The process also involves placing an adhesive film 30 on plane 21 of the upper cavity 31 to attach the module to body 1.

Advantageously, the film can include radial grooves from the centre to the outside to allow an air supply from the space corresponding to the clearance between the module and the upper cavity 31.

Alternatively, the adhesive may have adhesive points sized to leave an adjacent air space (s) or duct(s) adjacent to plane 21 and under the module after pressing. In particular, this adhesive can be an adhesive film that can be pre-cut (punched) according to the size (or section) of the channels (or recesses) required.

Then, in step E, the process provides for the advantageous transfer in a single operation of the assembly comprising the module, the porous or permeable material and the battery and the connection of the battery to the circuit 18p at the same time.

The invention applies to the manufacture of electrical/electronic objects comprising a battery inserted in the object and having an air supply extending from the battery to a source of air or oxygen. For example, thanks to the latest embodiment, it is possible to insert not only the battery with a relatively long service life but also an electronic circuit (display, fingerprint sensor, etc.) from outside the object. The object can be a connected watch, a bracelet with radio frequency transponder, a passport, a mobile phone, a computer, an autonomous M2M module or any other object . . . )

The invention also provides for a conduit closure film on the module or at least on the air openings so as to close them and thus increase the battery life. The film can be a repositionable adhesive with a gripping tab.

Where appropriate, the invention may provide means of closing the air or oxygen supply to close the conduit inside the object. They may include a check valve that can be operated from the outside, in particular by a mechanical or micro-electrical or piezoelectric switch.

The invention claimed is:

1. A process for manufacturing a smart card comprising a body and a metal-air battery integrated in the body, said battery comprising an electrolyte layer and an air-permeable porous protective membrane covering the electrolyte layer,
said process comprising a step of forming two lateral air supply ducts extending from the protective membrane at two opposite lateral ends of the battery to an air source outside the smart card, wherein a second porous air or oxygen-permeable material, distinct from said air-permeable porous protective membrane, is contained in said ducts and completely closes said ducts along its path, at least in places along its path,
said process further comprising a step of forming in said body a cavity opening into a surface of the body and a step of placing an electronic chip module in the cavity, said battery placed under the chip module, and arranging a conduit in a space at a bottom wall of the cavity,
wherein said two lateral air supply ducts extend upward and perpendicular, with respect to a top of the smart card, along open vertical walls of said cavity,
wherein said conduit extends parallel along the bottom wall of the cavity, with respect to a top of the smart card, and continues perpendicular up and around the battery and chip module to the air source,
whereby said two lateral air supply ducts and said conduit provide said battery access to said air source for powering said smart card via electrochemical reaction.

2. Process according to claim 1, wherein said electronic chip module comprises a porous support film permeable to air or permeable to oxygen and/or metallizations with perforations or recesses.

3. Process according to claim 1, wherein said conduit extends through the chip module.

4. Process according claim 1, wherein the conduit comprises a layer of porous or oxygen-permeable material extending parallel to one of the main surfaces of the body.

5. Process according to claim 1, wherein the conduit comprises a layer of porous or oxygen-permeable material extending perpendicular to a major surface of the body.

6. Process according to claim 1, wherein the duct is in the form of a cylinder, a ring, a plate, or capillaries for containing said second porous air or oxygen-permeable material.

7. Process according to claim 1, wherein the porous or oxygen-permeable material comprises an end or zone placed against the membrane of the battery.

8. Process according to claim 1, wherein the porous or oxygen-permeable material is selected from a waterproof and breathable fabric based on poly tetrafluoroethylene or polymer paper, a fabric having undergone a waterproofing treatment but remaining porous and permeable to air.

9. Process according to claim 1, wherein the porous or oxygen-permeable material is selected from a mixture of glass fibre and poly tetrafluoroethylene, zeolite, a mixture of $TiO_2$ nano fibres, elements consisting of $Y_2O_3$-stabilized $ZrO_2$ or CaO, porous silicon, dimethylsilicone or other silicone type layer.

10. A portable smart card comprising a body and a metal-air battery integrated in the body, said battery comprising an electrolyte layer and an air-permeable porous protective membrane covering the electrolyte layer;

two lateral air supply ducts extending from said protective membrane at two opposite lateral ends of the battery to an air source outside the smart card, and an air-permeable porous material, distinct from said air-permeable porous protective membrane, contained in said duct and completely closing said ducts along its path, at least in places along its path a cavity opening into a surface of the body;

an electronic chip module in the cavity, said battery under the chip module; and a conduit arranged in a space at a bottom wall of the cavity, wherein said two lateral air supply ducts extend upward and perpendicular, with respect to a top of the smart card, along open vertical walls of said cavity, wherein said conduit extends parallel along the bottom wall of the cavity with respect to a top of the smart card, and continues perpendicular up and around the battery and chip module to the air source, whereby said two lateral air supply ducts and said conduit provide said battery access to said air source for powering said smart card via electrochemical reaction.

11. Portable object according to claim 10, wherein the porous or oxygen-permeable material is hydrophobic or waterproof.

12. Portable object according to claim 10, wherein the porous or oxygen-permeable material is in the form of a layer extending substantially over the entire surface of smart card inside or on the surface.

* * * * *